United States Patent
Steller

(10) Patent No.: US 6,411,694 B1
(45) Date of Patent: Jun. 25, 2002

(54) ARRANGEMENT FOR IMPROVING A TELEPHONE SYSTEM

(75) Inventor: Johan P. Steller, Slependen (NO)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/326,411

(22) Filed: Jun. 4, 1999

(30) Foreign Application Priority Data

Apr. 15, 1999 (NO) .......................................... 19991801

(51) Int. Cl.[7] .......................... H04M 1/60; H04M 9/00; H04M 1/00; H04M 3/00
(52) U.S. Cl. .................. 379/167.13; 379/177; 379/377; 379/382; 379/387; 379/396
(58) Field of Search .............................. 379/156, 161, 379/162, 163, 164, 165, 166, 167, 379, 377, 381, 382, 385, 387, 380, 396, 399, 188, 194, 442, 177

(56) References Cited

U.S. PATENT DOCUMENTS

| | | | |
|---|---|---|---|
| 4,136,266 A | * 1/1979 | Cohen et al. | 379/194 |
| 4,169,217 A | * 9/1979 | Szanto et al. | |
| 4,332,983 A | 6/1982 | Vakili | 179/17 B |
| 4,546,214 A | * 10/1985 | Laing | |
| 4,653,094 A | 3/1987 | Rasmussen et al. | 379/396 |
| 4,726,048 A | * 2/1988 | Waldman et al. | 379/7 |
| 4,747,128 A | 5/1988 | Chan et al. | 379/194 |
| 5,388,153 A | * 2/1995 | Burger et al. | 379/164 |
| 5,414,764 A | * 5/1995 | Watanabe et al. | 379/377 |
| 5,422,947 A | * 6/1995 | Azem | 379/396 |
| 5,465,297 A | * 11/1995 | Azem | 379/387 |
| 5,521,974 A | * 5/1996 | Hayashi et al. | 379/381 |
| 5,533,117 A | * 7/1996 | Kim | 379/377 |
| 5,771,285 A | * 6/1998 | Wittman | 379/377 |
| 5,796,789 A | 8/1998 | Eftechiou | 379/35 |
| 5,838,778 A | * 11/1998 | Jung | 379/182 |
| 6,167,262 A | * 12/2000 | Tanigawa | 379/156 |

FOREIGN PATENT DOCUMENTS

| | | |
|---|---|---|
| EP | 0 182 393 A3 | 5/1986 |
| EP | 0 348 956 A2 | 1/1990 |
| GB | 2154392 A | 9/1985 |
| GB | 2266430 A | 10/1993 |

OTHER PUBLICATIONS

Delangue, P., International Search Report, International App. No. PCT/EP00/03418, pp. 1–4.

* cited by examiner

*Primary Examiner*—Binh Tieu
(74) *Attorney, Agent, or Firm*—Jenkens & Gilchrist, P.C.

(57) ABSTRACT

The present invention relates to an arrangement, for improving a telephone system in which a plurality of analogue phones are connected to a single line, and for the purpose of providing an arrangement which can solve the problem related to interruption of an in progress conversation or modem connection in a group of parallelly connected telephones, it is according to the present invention suggested that said arrangement comprises voltage sensing means, said voltage sensing means being adapted to sense a first higher dc voltage across the line in standby mode, as well as a second lower dc voltage in the active (conversation) mode.

12 Claims, 2 Drawing Sheets

Current pulse to magnetic latch indicator

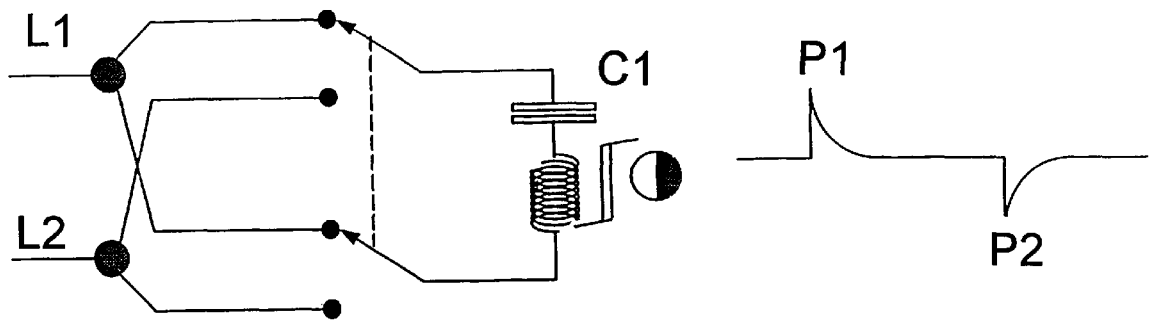
Figure 1  Current pulse to magnetic latch indicator
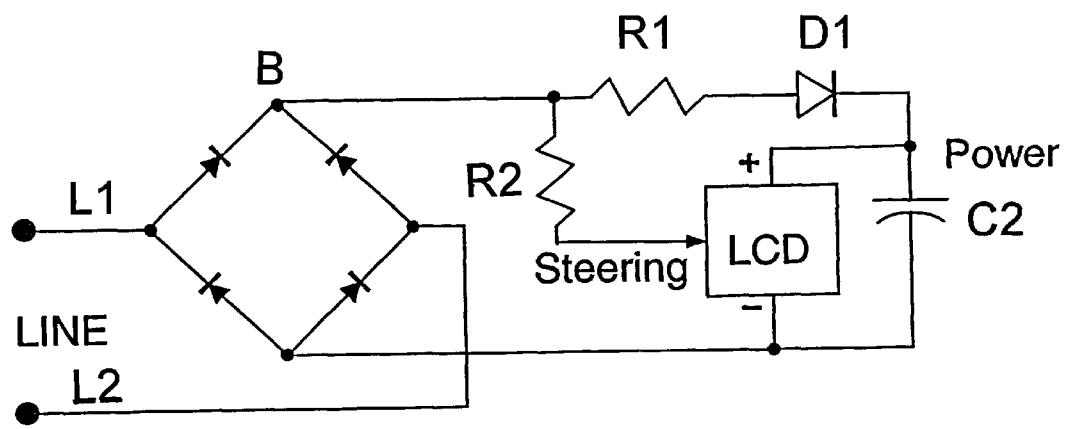
Figure 2

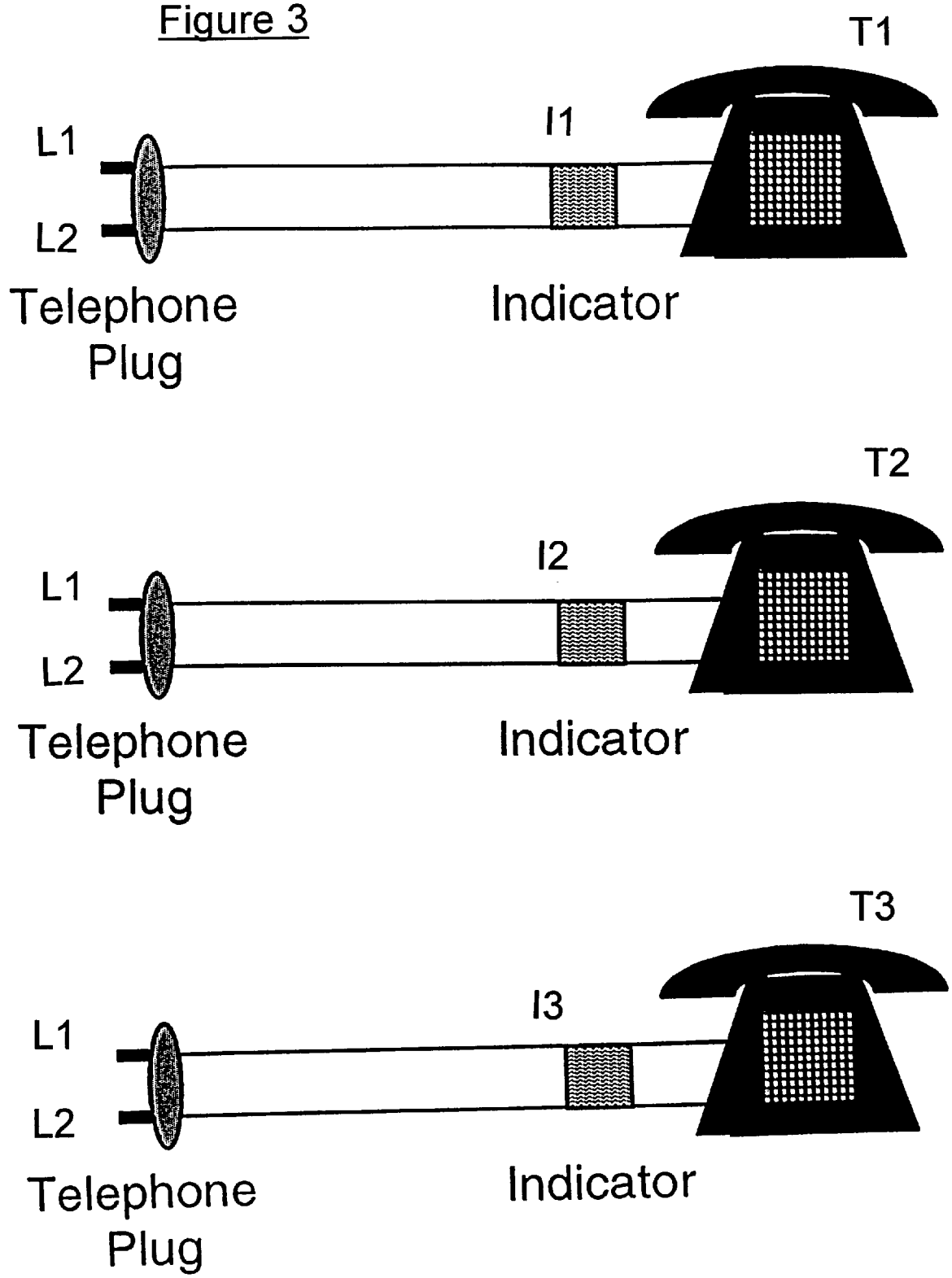

ARRANGEMENT FOR IMPROVING A TELEPHONE SYSTEM

FIELD OF THE INVENTION

The present invention relates to an arrangement for improving a telephone system in which a plurality of analogue phones are connected to a single line.

Such parallelly coupled telephones, or party phones, can usually be found in most residences. However, the present invention is applicable to any number or group of telephones which are connected in parallel.

1. Technical Background

When there are multiple analogue phones connected to a single line there is often the problem that an in progress conversation or modem connection will be interrupted by a second user attempting to make an outgoing call.

There has been contemplated some form of centralized PBX or similar in order to resolve this problem, but this will entail an arrangement which will be too expensive for the usual customers.

2. Objects of the Invention

A main object of the present invention is to provide an arrangement which by inexpensive and yet efficient means can resolve the above problem of interruption of on-going conversation or modem connection.

Another object of the present invention is to provide an arrangement which can either be built into new phones at a very low cost or be built into an in-line adapter with a short cable for an existing phone.

Another object of the present invention is to provide an arrangement which requires a no external power for its operation.

Still another objective of the present invention is to provide an arrangement that does not require a "rewiring" of the existing telephone installation, such as a current sensing alternative would require.

BRIEF DISCLOSURE OF THE INVENTION

The above objects are achieved in an arrangement as stated in the preamble, which according to the present invention is characterized in that said arrangement comprises voltage sensing means, said voltage sensing means being adapted to sense a first higher DC voltage across the line in standby mode, as well as a second lower DC voltage in the active (conversation) mode.

In other words, the present invention is providing a solution based on voltage transition sensing and such a voltage sensing circuit may be inserted across the telephone itself or in the line connecting the telephone to the wall contact. When any handset in the house is lifted, the voltage is reduced at all the phones, such that each visibility devise or display at each phone location will show that the line is in the active state.

Further features and advantages of the present invention will appear from the following description taken in conjunction with the enclosed drawing, as well as from the enclosed patent claims.

BRIEF DISCLOSURE OF THE DRAWINGS

FIG. 1 is a schematical drawing illustrating a first embodiment of the present invention comprising a magnetically latching display alternative.

FIG. 2 is a schematical drawing illustrating a second embodiment of the present invention comprising an LCD display alternative.

FIG. 3 is a schematical drawing illustrating how an arrangement according to the present invention can be inserted in the individual telephone plug line of several telephones which are connected in parallel.

DETAILED DESCRIPTION OF EMBODIMENTS

As stated above, the present arrangement relates to an arrangement for improving a telephone system in which a plurality of analogue phones connected to a single line. The invention provides a solution by letting the arrangement comprise voltage sensing means, said voltage sensing means being adapted to sense a first higher DC voltage across the line in standby mode, as well as a second lower DC voltage in the active (conversation) mode.

This lower DC voltage is supplied to a visibility device or indicator, so as to make visible at each phone location that the line is in the active state.

In other words the solution according to the present invention is based on voltage transition sensing.

In the normal idle state an analogue telephone line typically has 48 VDC applied to the telephone terminals. When the handset is lifted a low impedance is connected across the circuit and the voltage drops to 10 or 20 volts drawing current from the exchange, which senses this and inserts equipment to monitor for the dialing pulses.

The active "talking" state has the lower DC voltage at the telephone.

The third state is when the exchange rings the phone by applying ca. 60 VAC to the phone line, during which state the indicators will oscillate in sympathy with the applied voltage. When the handset is picked up the line will go to the low voltage state. In the following, there will be given a detailed description of two quite different solutions which both have in common that no external power source is required. The actual line voltage applied to the telephone has, as detailed above, characteristics which both solutions use to indicate the current state of the telephone line.

Magnetically Latching Display Alternative

The solution shown in FIG. 1 is based on using a well known but now old technology. The magnetically latched indicator is still sometimes used in large displays at airports and railway stations for departure and arrival information. In these displays each of the seven segments for each character is in either the white or black state as steered by a positive or negative pulse. Both states are quite stable and require no power, power is only applied as a pulse to change state.

When the device is first connected across the phone line the capacitor C1 is charged. The charging current is shown in the figure as a pulse P1 with exponential decay. This pulse will set the magnetic latch indicator in either the white or black state.

When the handset is lifted the phone line voltage goes to near zero and the capacitor C1 is discharged. This current pulse C2 is in the opposite direction and thus sets the indicator in the other position. The two pole form C switch shown in FIG. 1 is only used to set a consistent display state as the phone line polarity is not necessarily the same at all phone contacts in the house.

LCD Alternative

The solution in FIG. 2 uses modern LCD technology for the display. Here, a bridge rectifier B is used to overcome the phone contact polarity problem. The LCD requires some micoamps of drive power to operate, and this power is taken from the phone line through resistor R1 and diode D1 and charges the capacitor C2, which supplies power. The steering voltage is taken nearly directly from the rectified line voltage through R2.

Possibly, the power could be delivered from a button battery.

It is to be understood that each of the visibility devises or indicators could be inserted in the telephone itself or in the line connecting the telephone to the wall contact.

In FIG. 3 there is illustrated I1, I2 and I3, respectively, three telephones T1, T2 and T3, respectively, which are connected in parallel to a common telephone line through their respective plugs. At each telephone there is illustrated an example of an indicator being inserted in the line connecting the telephone to the wall contact. It is to be understood that each telephone, having an indicator or not will give an alert signal when any handset of the illustrated group is lifted. This handset lifting will entail that the voltage is reduced at all the telephones involved in the group or the household, further entailing that each display or indicator will show that the line is in the active state.

I claim:

1. Arrangement in a telephone system in which a plurality of analogue phones are connected to a line, said arrangement comprising a magnetic latch indicator connected to said line in series with a capacitor (C1), said magnetic latch indicator is adapted to change state as a result of current pulses of opposite polarity on the line due to a transition between a higher DC voltage across the line in stand-by mode and a lower DC voltage across the line in active (conversation) mode, and vice versa without requiring external power applied thereto, said magnetic latch indicator being operable to indicate whether the line is already in use by one of the plurality of analogue phones.

2. Arrangement as claimed in claim 1, said arrangement further comprising one indicator at each of a group of telephones which are connected in parallel, so that when any handset in the group of telephones is lifted, then each indicator, thereof, will indicate that the line is in the active state.

3. Arrangement as claimed in claim 1, said arrangement further comprising a two pole change-over switch inserted between the line and said magnetic latch indicator in order to change the polarity of the indication.

4. Arrangement in a telephone system in which a plurality of analogue phones are connected to a single line, said arrangement comprising a Liquid Crystal Display (LCD) which is provided with a steering input coming directly from the line through a high impedance resistor (R2), and which is adapted to sense a first higher DC voltage across the line in stand-by mode, as well as a second lower DP voltage in active (conversation) mode, and visibly indicate the line, being in use or not.

5. Arrangement as claimed in claim 4, wherein said LCD display is powered from the line (L1, L2) through a first resistance (R1) in series with a diode (D1) which in turn charge a capacitor (C2); power to the LCD being taken from said capacitor (C2).

6. Arrangement as claimed in claim 4, wherein the LCD display is powered from a button battery.

7. Arrangement as claimed in claim 4, further comprising one indicator at each of a group of telephones which are connected in parallel, so that when any handset in the group of telephones is lifted, then each indicator thereof will indicate that the line is in the active state.

8. Arrangement in a telephone system in which a plurality of analogue phones are connected to a single line, said arrangement comprising a Liquid Crystal Display (LCD) that is provided with a steering input coming directly from the line through a rectifier and a high impedance resistor (R2), wherein the arrangement is adapted to sense a first higher DC voltage across the line in stand-by mode, as well as a second lower DC voltage in active (conversation) mode, and visibly indicate the line being in use or not.

9. Arrangement as claimed in claim 8, wherein said LCD display is powered from the line through a first resistance (R1) in series with a diode (D1) which in turn charge a capacitor (C2), power to the LCD being taken from said capacitor (C2).

10. Arrangement as claimed in claim 8, wherein the LCD display is powered from a button battery.

11. Arrangement as claimed in claim 8, further comprising one indicator at each of a group of telephones which are connected in parallel, so that when any handset in the group of telephones is lifted, then each indicator thereof will indicate that the line is in the active state.

12. Arrangement as claimed in claim 8, wherein the rectifier is a bridge rectifier used to substantially maintain the same phone line polarity at each of said plurality of analogue phones.

* * * * *

UNITED STATES PATENT AND TRADEMARK OFFICE
CERTIFICATE OF CORRECTION

PATENT NO. : 6,411,694 B1    Page 1 of 1
DATED : June 25, 2002
INVENTOR(S) : Johan P. Steller It is certified that error appears in the above-identified patent and that said Letters Patent is hereby corrected as shown below:

Title page,
Item [73], Assignee, replace "Telefonaktiebolaget LM Ericsson, Stockholm (SE)" with -- Telefonaktiebolaget LM Ericsson (publ), Stockholm (SE) --

Column 4,
Line 3, replace "DP voltage" with -- DC voltage --
Line 4, replace "indicate the line," with -- indicate the line --
Line 36, replace "so that when" with -- such that when --
Lines 37-38, replace "then each indicator thereof will indicate that the line is in the active state." with -- each indicator thereof indicates that the line is in an active state. --

Signed and Sealed this

Twenty-seventh Day of January, 2004

JON W. DUDAS
*Acting Director of the United States Patent and Trademark Office*